United States Patent [19]

Birkelund et al.

[11] Patent Number: 5,362,921
[45] Date of Patent: Nov. 8, 1994

[54] FLEXIBLE SUBSEA LINE

[75] Inventors: Ove S. Birkelund; Inge J. Vintermyr, both of Oslo, Norway

[73] Assignee: Alcatel STK A/S, Oslo, Norway

[21] Appl. No.: 857,548

[22] Filed: Mar. 26, 1992

[30] Foreign Application Priority Data

Apr. 25, 1991 [NO] Norway ................... 911644

[51] Int. Cl.⁵ .................. F16L 11/12; C23F 13/00
[52] U.S. Cl. ...................... 174/47; 138/110;
  138/111; 204/196; 405/158
[58] Field of Search .............. 174/47, 68.1, 102 R,
  174/106 R; 405/158; 138/103, 108, 110, 111;
  204/196

[56] References Cited

U.S. PATENT DOCUMENTS

| | | | |
|---|---|---|---|
| 3,526,086 | 9/1970 | Morgan | 174/47 X |
| 4,078,510 | 3/1978 | Morgan | 405/158 X |
| 4,224,462 | 9/1980 | Occhini et al. | 174/37 |
| 4,765,711 | 8/1988 | Obst | 405/158 X |

FOREIGN PATENT DOCUMENTS

| | | |
|---|---|---|
| 0177475 | 4/1986 | European Pat. Off. ............ 405/158 |
| 1210206 | 10/1970 | United Kingdom . |
| 1379832 | 1/1975 | United Kingdom . |

*Primary Examiner*—Leo P. Picard
*Assistant Examiner*—Hyung S. Sough
*Attorney, Agent, or Firm*—Spencer, Frank & Schneider

[57] ABSTRACT

A flexible subsea line includes a number of longitudinal elements including fluid/gas conducting tubes enclosed within a common outer cover. A number of the tubes are made of steel and each of these steel tubes is in longitudinal electrical contact with at least two sacrificial anodes.

13 Claims, 1 Drawing Sheet

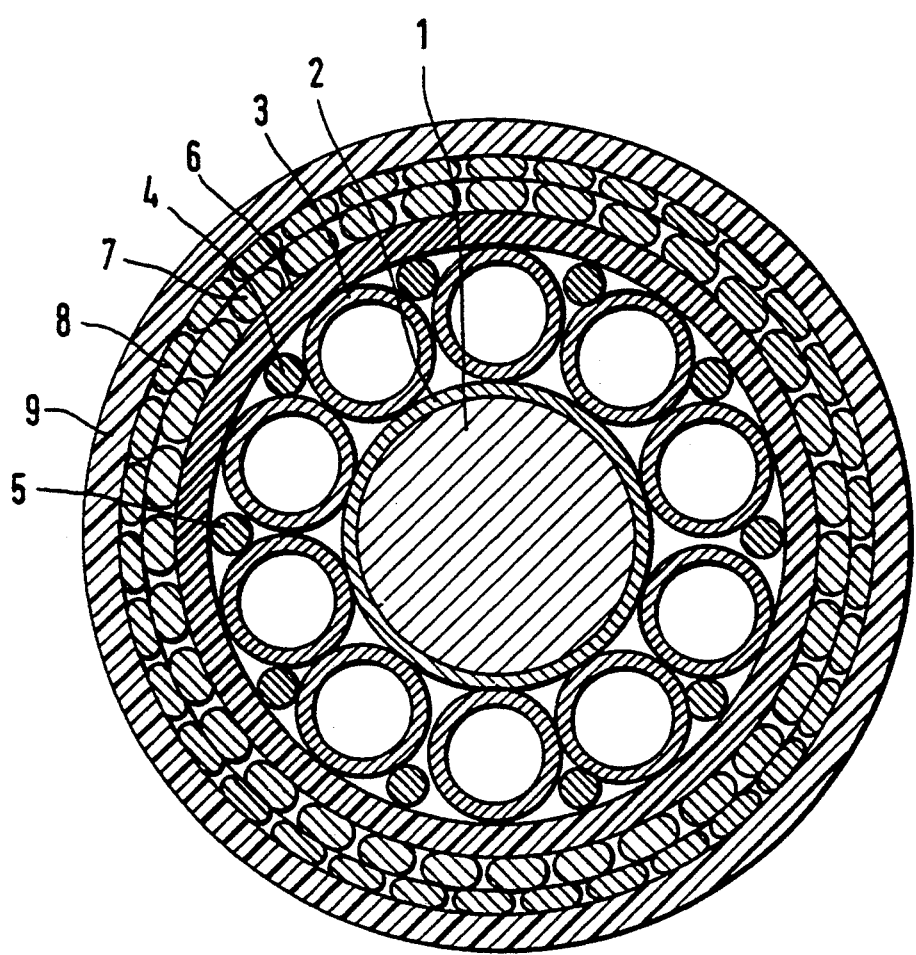

FLEXIBLE SUBSEA LINE

BACKGROUND OF THE INVENTION

1. Field of the Invention

The present invention relates to flexible subsea lines having a number of fluid/gas conducting tubes and possibly other longitudinal elements like electrical conductors and cables enclosed wi thin a common outer cover. In particular, the invention relates to corrosion protection of lines having tubes for conducting control and service fluids for subsea installations.

2. Background Information

With a few exceptions, the stainless steels conventionally used are in general not sufficiently corrosion resistant when exposed to sea water. Additional corrosion protection, like cathodic protection is therefore required for stainless steel contructions that will, or might, be exposed to sea water. For freely exposed surfaces, cathodic protection is easily achieved, but protection of steel bundles beneath a polyethylene jacket is far more difficult.

SUMMARY OF THE INVENTION

The object of the present invention is therefore to improve the corrosion protection of subsea flexible lines in order to satisfy offshore requirements.

So far, the construction of subsea lines has been based upon the use of relatively large fluid/gas tubes, with tube diameters larger than one inch. These tubes have been corrosion protected by placing external sacrifical anodes at interval s along the si de of the tubes. Such an arrangement will under certain circumstances be subjected to corrosion attacks, in particular when the tubes are covered with an outer plastic sheath. Mechanical damages of the plastic sheath may, if there is insufficient contact between the tubes and the sheath, lead to water penetration. In such situations, sacrifical anodes on the outside will not give sufficient cathodic protection to the narrow interstices under the plastic sheath.

According to the invention there are obtained subsea lines and umbilicals having excellent corrosion protection, satisfying all present offshore requirements. The cathodic protection of the stainless steel tubes is obtained by a 'built in' sacrificial anode system. The outer surfaces of the small tubes will achieve cathodic protection from integrated zinc wires, while the lower surfaces of the tubes will be protected by galvanized steel tape.

BRIEF DESCRIPTION OF THE DRAWINGS

Above mentioned and other features and objects of the present invention will clearly appear from the following detailed description of embodiments of the invention taken in conjunction with the drawing which illustrates a crossection of a line.

DETAILED DESCRIPTION OF THE PREFERRED EMBODIMENT

In the figure is shown one embodiment of a steel tube umbilical having an inner compartment or core 1 which may contain one or more electrical cables and/or optical cables and/or a (not shown) encompassed by at least one layer of galvanized steel tape 2. Normally there will be used two such tapes. This steel tape layer is provided for giving mechanical protection to the inner core 1 when stranding steel tubes over the core.

In mechanical contact with the galvanized steel tape(s) 2 there are a number of steel tubes 3 for carrying control and service fluids for subsea installations, preferably stranded around the line core. The steel tubes are normally made of stainless steel of quality UNS S31803 or UNS S31603. The purpose of the galvanized steel tape bedding 2 is also to provide cathodic protection of the steel tubes 3, if the outer layers are ruptured and sea water enters the interstices between the steel tube layer and the bedding 2. These interstices can in addition be filled with a water repellant compound. In the outer interstices between the tubes 3 there are arranged a number of zinc wires 4, 5. Each of the small tubes 3 wi 11 therefore be in direct electrical contact with the inner galvanized steel tape(s) 2 on the lower side and with two zinc wires 4,5 on the outer side. The zinc wires 4,5 will also provide some, but very limited cathodic protection of the lower side of the steel tubes, due to the very narrow passages between the steel tubes. The combination of the zinc wires and the galvanized steel tapes give an efficient protection of the steel tubes. Over the tubes 3 and zinc wires 4,5 there is arranged a thermoplastic sheath 6 as a bedding for at least two armour layers 7,8. Outer layers 9 can contain thermoplastic sheaths, such as medium density polyethylene, and PP (polypropylene) yarn. Depending upon the circumstances and environmental conditions, there may, as an alternative to a double metal armour layer, be used only one metal armour layer or no metal armour at all. The outer layers 9 could then be strengthened.

In the embodiment shown the dimensions are as follows: The core has an outer diameter of 37 mm and it is covered with a layer of two 0.5 mm galvanized steel tapes. Each of the ⅝" (16 mm) steel tubes have a wall thickness of 0.080" (2 mm), and the zinc wires have a diameter of 5 mm.

The steel tubes and the inner core should be dimensioned in order to maintain good mechanical contact between the steel tubes and the zinc wires. It is within the scope of the invention to arrange the steel tubes in more than one layer as long as the 'built in' sacrificial anode system is maintained.

We claim:

1. A flexible subsea line comprising:
   a plurality of longitudinal elements extending the length of the subsea line, said elements including at least fluid/gas conducting tubes and at least two sacrificial anodes enclosed within a common outer cover,
   wherein a plurality of said tubes are made of stainless steel;
   wherein each of said steel tubes is in longitudinal electrical contact with at least two sacrificial anodes along their entire length; and
   wherein said tubes are stranded in at least one layer on a surface of galvanized steel tapes arranged around a core containing other longitudinal elements, said other longitudinal elements being at least one of electrical conductors and optical fibers.

2. A line according to claim 1, wherein said tubes are stranded in a tight layer on at least one layer of said galvanized steel tapes arranged around said core containing said other longitudinal elements.

3. A line according to claim 2, wherein said common outer cover includes a sheath of a medium density polyethylene.

4. A line according to claim 2, wherein said core includes a further steel tube.

5. A line according to claim 1, wherein said steel tubes are arranged in more than one layer.

6. A line according to claim 1, wherein said sacrificial anodes comprise zinc wires.

7. A line according to claim 1, wherein said stainless steel is one of quality UNS S31803 and UNS S31603.

8. A flexible subsea line comprising:
a longitudinal core for carrying at least one of electrical and optical cables;
at least one layer of galvanized steel tape encompassing said longitudinal core for giving mechanical protection to said longitudinal core;
a plurality of longitudinal stainless steel tubes, in mechanical contact with said at least one layer of galvanized steel tape, for carrying control and service fluids for subsea installations, said longitudinal stainless steel tubes being stranded around said longitudinal core, a water-repellant compound disposed in inner interstices between said longitudinal stainless steel tubes and said at least one layer of galvanized steel tape;
a plurality of longitudinal sacrificial anodes, said anodes comprising zinc wires disposed in outer interstices between said longitudinal stainless steel tubes in electrical contact with said longitudinal stainless steel tubes down their length in the subsea line; and
a thermoplastic sheath disposed over said plurality of longitudinal stainless steel tubes and zinc wires.

9. The line according to claim 8, further comprising at least one armor layer disposed on an outer surface of said thermoplastic sheath surrounding said sheath.

10. A flexible subsea line comprising:
a core for containing electrical/optical conductors/cables;
a plurality of galvanized steel tapes arranged around said core;
a plurality of fluid/gas conducting tubes;
a common outer cover enclosing said plurality of fluid/gas conducting tubes; and
at least two outer sacrificial zinc anodes;
wherein said fluid/gas conducting tubes are stranded in at least one layer on a surface of said galvanized steel tapes,
wherein at least two of said fluid/gas conducting tubes are made of steel, and
wherein each of said steel fluid/gas conducting tubes is in longitudinal electrical contact with said at least two outer sacrificial anodes.

11. The line according to claim 10, wherein said fluid/gas conducting tubes are arranged in a stranded tight layer directly on said galvanized steel tapes.

12. The line according to claim 10, wherein at least some of said fluid/gas conducting tubes are made of stainless steel.

13. The line according to claim 10, wherein said core includes a steel tube.

* * * * *